(12) United States Patent
Talaat

(10) Patent No.: US 8,719,708 B2
(45) Date of Patent: May 6, 2014

(54) SYSTEMS AND METHODS FOR DYNAMIC HISTORICAL BROWSING

(75) Inventor: Mohamed I. Talaat, Palisades Park, NJ (US)

(73) Assignee: Morgan Stanley, New York, NY (US)

( * ) Notice: Subject to any disclaimer, the term of this patent is extended or adjusted under 35 U.S.C. 154(b) by 359 days.

(21) Appl. No.: 12/607,292

(22) Filed: Oct. 28, 2009

(65) Prior Publication Data

US 2011/0099477 A1    Apr. 28, 2011

(51) Int. Cl.
*H04L 29/08* (2006.01)

(52) U.S. Cl.
CPC ....................................... *H04L 29/08* (2013.01)
USPC ............................. 715/738; 715/733; 715/736

(58) Field of Classification Search
CPC ........................................................ H04L 29/06
USPC .......................................... 707/695; 715/733
See application file for complete search history.

(56) References Cited

U.S. PATENT DOCUMENTS

| | | | |
|---|---|---|---|
| 5,860,071 A | 1/1999 | Ball et al. | |
| 6,366,933 B1 | 4/2002 | Ball et al. | |
| 6,405,223 B1 * | 6/2002 | Kelley et al. | 715/205 |
| 6,602,298 B1 * | 8/2003 | Kirshenbaum | 715/234 |
| 6,667,751 B1 * | 12/2003 | Wynn et al. | 715/833 |
| 7,263,521 B2 * | 8/2007 | Carpentier et al. | 1/1 |
| 7,539,680 B2 * | 5/2009 | Tester | 1/1 |
| 7,689,601 B2 * | 3/2010 | Wu | 707/999.204 |
| 2002/0116375 A1 | 8/2002 | Blume et al. | |
| 2002/0120648 A1 | 8/2002 | Ball et al. | |
| 2002/0156800 A1 * | 10/2002 | Ong | 707/203 |
| 2004/0177058 A1 * | 9/2004 | Carpentier et al. | 707/1 |
| 2005/0203882 A1 | 9/2005 | Godley | |
| 2008/0140700 A1 * | 6/2008 | Carpentier et al. | 707/102 |
| 2008/0294978 A1 * | 11/2008 | Klintsov et al. | 715/234 |
| 2009/0288077 A1 * | 11/2009 | Miranda-Steiner et al. | 717/173 |
| 2009/0327261 A1 * | 12/2009 | Hawkins | 707/5 |

FOREIGN PATENT DOCUMENTS

| | | | | |
|---|---|---|---|---|
| EP | 1006462 A2 | 6/2000 | | |
| EP | 1160692 A2 * | 12/2001 | | G06F 17/30 |
| EP | 1160692 A3 | 4/2003 | | |

OTHER PUBLICATIONS

Kammenhuber et al.; Web search clickstreams; © 2006; ACM; 6 pages.*
International Search Report from International Application No. PCT/US2010/054447 dated Oct. 28, 2010, 4 pages.
Written Opinion from International Application No. PCT/US2010/054447 dated Oct. 28, 2010, 8 pages.
Simonson et al., "Version augmented URIs for reference permanencevia an Apache module design", Computer Networks and ISDN Systems, Apr. 1, 1998, pp. 337-345.

* cited by examiner

*Primary Examiner* — Linh K Pham
(74) *Attorney, Agent, or Firm* — K&L Gates LLP

(57) ABSTRACT

Systems and methods for dynamic historical browsing of a collection of documents, such as a collection of webpages. In some embodiments, the entry point of the browsing experience may be a timestamp-based or version-based. The entry point may be established by a navigation parameter, such as a graphical slider, for example. A historical browsing experience may be replicated based on the entry point. The system may be implemented via client-side implementation or a server-side implementation. A rich interface application (RIA) may be used.

18 Claims, 5 Drawing Sheets

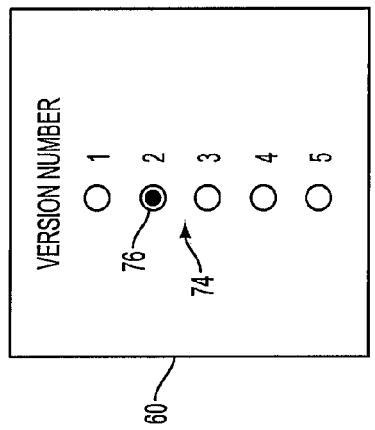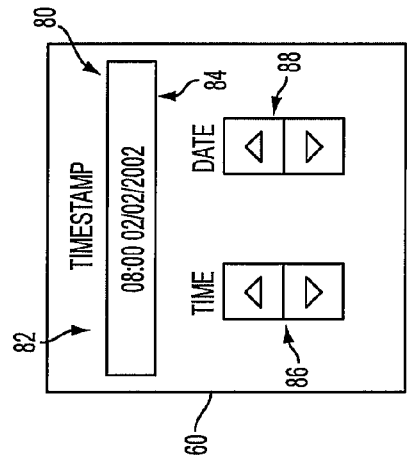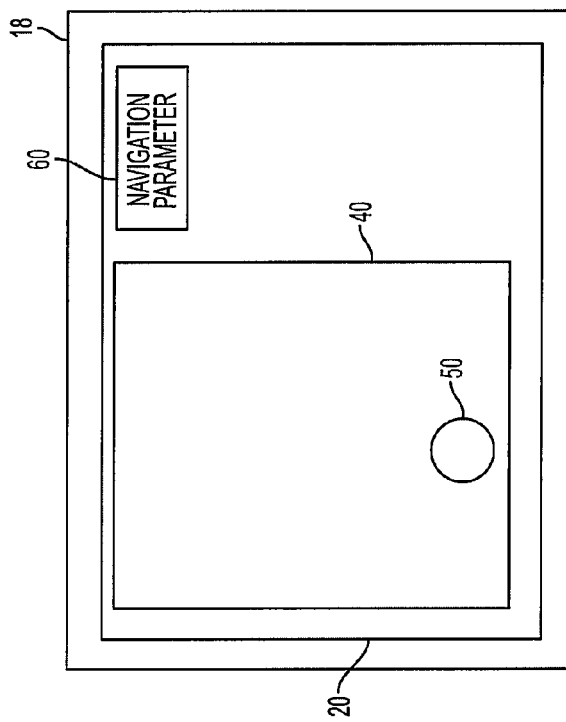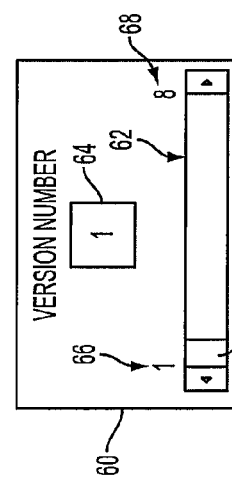

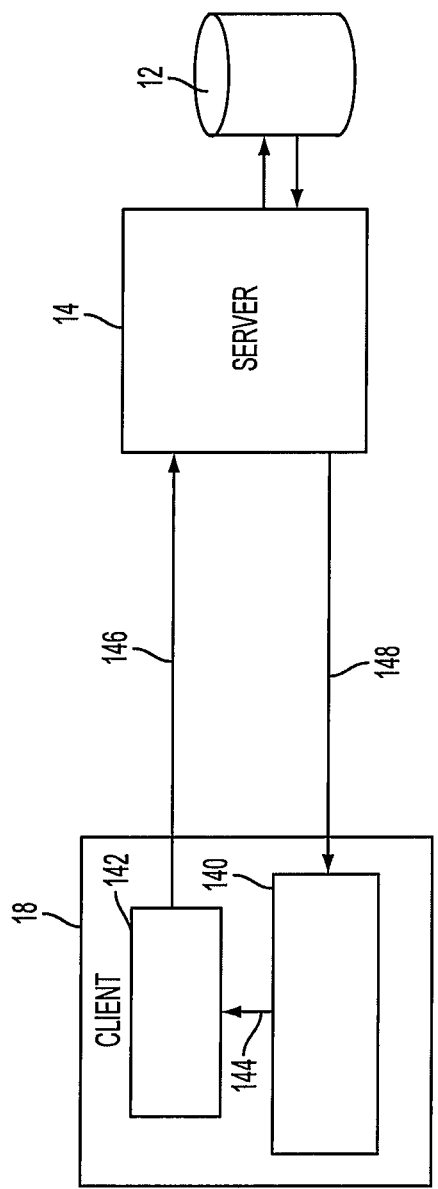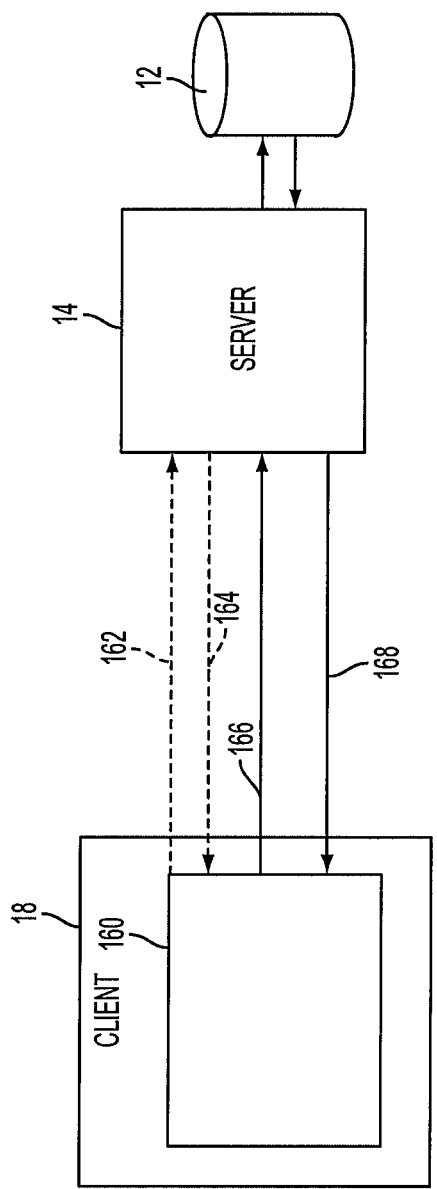

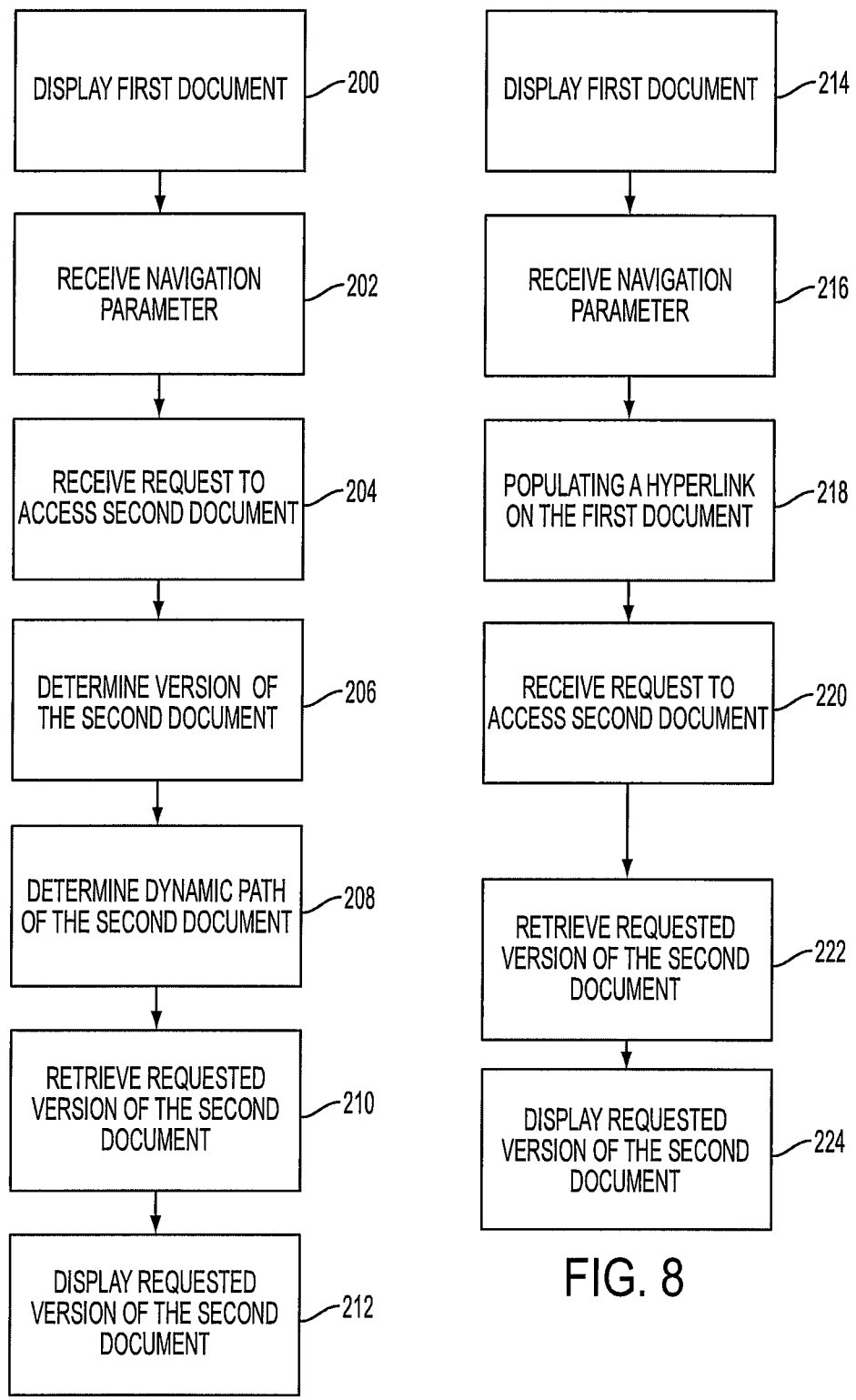

SYSTEMS AND METHODS FOR DYNAMIC HISTORICAL BROWSING

BACKGROUND

Electronically stored documents may be stored in a database or collection of databases. The documents may contain hyperlinks to other electronically stored documents. The hyperlinks may form an electronic link from one electronic document to another electronic database. When the link is accessed, or otherwise triggered by a user, the linked-to document may be retrieved from the database by a server. Typically, if the linked-to document is updated, such as when a new version of the document is created and stored in the database, any hyperlinks that link to that modified document are also updated to provide the proper path to the updated document. When the hyperlink is updated, a new version of the document with the updated hyperlink is typically stored in the database. Accordingly, when one document is revised, all documents that point to that document are usually also revised.

Additionally, for some contexts, such as financial models that comprise a collection of linked documents, the collection of interconnected documents can grow in the tens of thousands within a relatively short period of time. Some compliance and audit requirements require that past versions of documents need to be accessible. As part of compliance and/or audit requirements, previous versions of a certain documents may be retrieved from a server. This historical document, however, may contain hyperlinks to other documents. When retrieving this historical document, these links may not function as needed for the compliance and audit requirements. For example, the links may be inactive or may link to an undesired version of the linked-to document.

SUMMARY OF THE INVENTION

According to various embodiments, a computer-implemented method for browsing electronic documents comprises storing a plurality of electronic documents in a computer database, where the computer database is in electronic communication with a host server, where the plurality of documents comprises a first document and a second document, where the first document comprises a hyperlink to the second document, and where the second document comprises a first version and a second version. The method further comprises displaying the first document on a client computing device comprising a rich internet application, where the client computing device is in communication with the host server, where the client computing device comprises a processor circuit and a memory circuit, and where the host server comprises a processor circuit and a memory circuit. The method further comprises receiving by the rich internet application of the client computing device a client side navigation parameter, receiving by the rich internet application of the client computing device a client side request to access the second document using the hyperlink, determining with the rich internet application of the client computing device a requested version of the second document based on the client side navigation parameter, determining with the rich internet application of the client computing device a dynamic path for the requested version of the second document, where the requested version is one of the first version and the second version, retrieving by the host server the requested version of the second document based on the dynamic path, and displaying the requested version of the second document on the client computing device.

In one embodiment, the navigation parameter is a version request. In one embodiment, the navigation parameter is a timestamp request. In one embodiment, the first version is created at a first timestamp and the second version is created at a second timestamp that is later in time than the first timestamp. In one embodiment, the method further comprises comparing with the rich internet application the timestamp request to the first timestamp and the second timestamp, retrieving the first version is retrieved when the timestamp request is only subsequent to the first timestamp, and retrieving the second version when the timestamp request is subsequent to the first timestamp and the second timestamp. In one embodiment, content of the first document is updated based on the navigation parameter. In one embodiment, the navigation parameter is selected using a graphical input provided by the client computing device. In one embodiment, the graphical input is selected from a group consisting of a slider and a plurality of radio buttons.

According to various embodiments, a computer-implemented method for browsing electronic documents comprises storing a plurality of electronic documents in a computer database, where the plurality of documents comprises a first document and a second document, where the computer database is in electronic communication with a host server, where the second document comprises a first version and a second version, displaying the first document on a client computing device that is in communication with the host server, where the client computing device comprises a processor circuit and a memory circuit, and where the host server comprises a processor circuit and a memory circuit, receiving by the host server a client side navigation parameter from the client computing device, populating by the host server a hyperlink on the first document to the second document, where a dynamic path is associated with the hyperlink, where the dynamic path is at least partially based on the client side navigation parameter, where the dynamic path is associated with a requested version of the second document, receiving by the host server from the client computing device a request to access the second document using the hyperlink, retrieving by the host server the requested version of the second document based on the dynamic path, and displaying the requested version of the second document on the client computing device.

In one embodiment, the navigation parameter is a version request. In one embodiment, the navigation parameter is a timestamp request. In one embodiment, the first version is created at a first timestamp and the second version is created at a second timestamp. In one embodiment, the timestamp request is compared to the first timestamp and the second timestamp, and the first version is retrieved when the timestamp request is only subsequent to the first timestamp and the second version is retrieved with the timestamp request is subsequent to the first timestamp and the second timestamp. In one embodiment, content of the first document is updated based on the navigation parameter. In one embodiment, the navigation parameter is selected using a graphical input provided by the client computing device. In one embodiment, the graphical input is selected from a group consisting of a slider and a plurality of radio buttons.

According to various embodiments, a system comprises a computer database configured to store a plurality of documents, where the plurality of documents comprises a first document and a second document, where the first document comprises a hyperlink to the second document, where the second document comprises a first version and a second version, a host server in electronic communication with the computer database, a client computing device for displaying at least one of the plurality of documents, where the client computing device in communication with the host server, where the client computing device comprises a rich internet application, where the client computing device is configured to receive a navigation parameter, where the rich internet application is configured to determine a requested version of the second document and a dynamic path based on the navigation parameter, where the dynamic path is associated with one of the first version and the second version, and where the host server is configured to retrieve the requested version of the second document based on the dynamic path, and where the host server is configured to serve the requested version to the client computing device.

In one embodiment, the navigation parameter is one of a version request and a timestamp request.

According to various embodiments, a system comprises a computer database configured to store a plurality of documents, where the plurality of documents comprises a first document and a second document, where the first document comprises a dynamic hyperlink to the second document, where the second document comprises a first version and a second version, a host server in electronic communication with the computer database, a client computing device for displaying at least one of the plurality of documents, where the client computing device is configured to receive a navigation parameter, and where the client computing device is in communication with the host server, where the host server is configured to populate the dynamic hyperlink on the first document based on a navigation parameter, where the dynamic path is associated with a requested version of the second document, and where the host server is configured to retrieve the requested version of the second document based on the dynamic path.

In one embodiment, the navigation parameter is one of a version request and a timestamp request.

FIGURES

Various embodiments of the present invention are described herein by way of example in conjunction with the following figures wherein:

FIG. 2 illustrates a user device in accordance with various embodiments.

FIGS. 3A, 3B, and 3C illustrate non-limiting embodiments of a navigation parameter.

Figure 4:
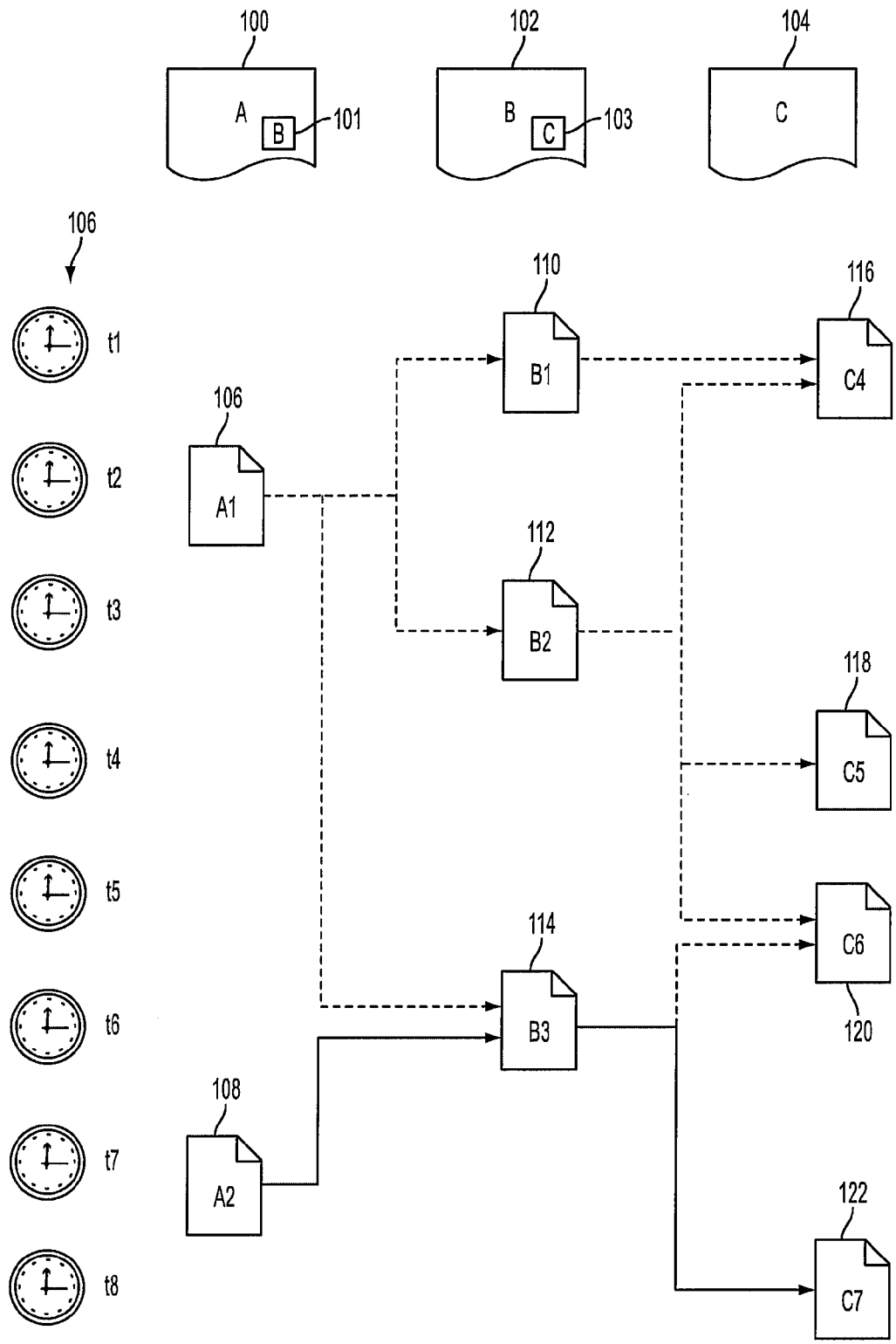

FIG. 4 illustrates a collection of interconnected documents in accordance with various embodiments.

FIG. 5 illustrates a client-side implementation of a historical browsing system in accordance with various embodiments.

FIG. 6 illustrates a server-side implementation of a historical browsing system in accordance with various embodiments.

FIG. 7 is flow chart of a client-side implementation of a historical browsing system in accordance with various embodiments.

FIG. 8 is a flow chart of a server-side implementation of a historical browsing system in accordance with various embodiments.

DETAILED DESCRIPTION OF THE INVENTION

Various non-limiting embodiments of the present disclosure will now be described to provide an overall understanding of the principles of the structure, function, manufacture, and use of the systems, apparatuses, accessories, and methods disclosed herein. One or more examples of these non-limiting embodiments are illustrated in the accompanying drawings. Those of ordinary skill in the art will understand that the systems, apparatuses, accessories, and methods specifically described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

Figure 1:
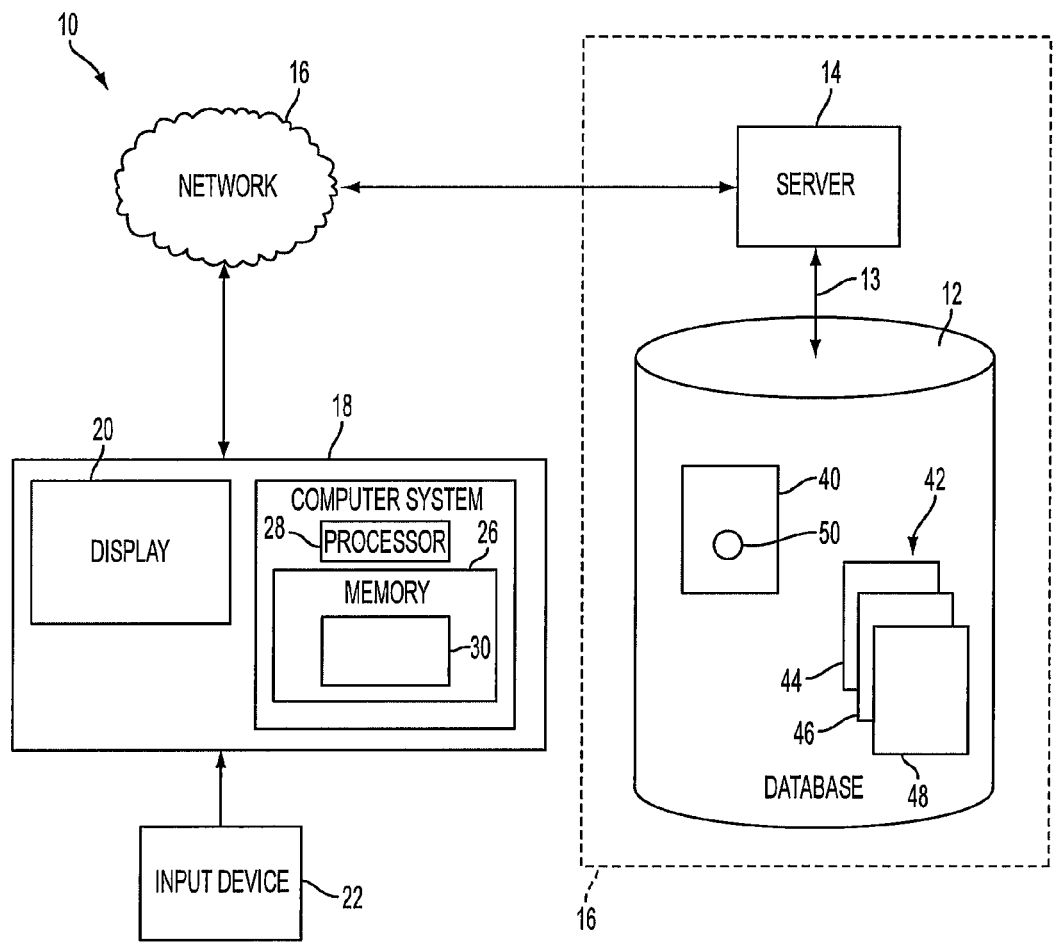
FIG. 1 illustrates a historical browsing system in accordance with various embodiments.

In one embodiment, referring to FIG. 1, a historical browsing system 10 may comprise a collection of networked electronic components. For example, the historical browsing system 10 may comprise at least one computer database 12 and a computer host server 14 in communication with the database 12 via a connection 13. The host server 14 may be capable of retrieving data from the database 12. The data stored in the database 12 may be stored in a non-volatile computer memory, such as a hard disk drive, a read only memory (e.g., a ROM IC), or other types of non-volatile memory. Also, as is to be appreciated, the data associated with the database 12 may be stored on a remote electronic computer system (not shown), for example. In some embodiments, the host server 14 and the database 12 may be grouped or combined into a single unit 16. Also, as may be appreciated, the historical browsing system 10 may comprise a plurality of computer servers 14 and a plurality of databases 12, which may or may not be grouped into various combinations. The host server 14 may be in communication with an electronic data communication network 16. The network 16 may comprise any suitable data communication network, such as one or a number of LANs and/or WANs, for example.

A client computer device 18 also may be in communication with the network 16. The client computer device 18 may be any suitable computer device, such as a laptop computer, a desktop computer, a network-enabled telephone, a minicomputer, a microcomputer, a mobile device, a personal data assistant, or a smartphone for example. The client computer device 18 may comprise a display 20 and an input device 22. The display 20 may be, for example, an LCD display or a CRT display. The input device 22 may be any suitable device(s), such as a keyboard, a mouse, a touch screen, a track ball, or a voice-recognition module, for example. The client computer device 18 may also comprise, or otherwise be in communication with a processor of the client computer device 18. The client computer device 18 may also comprise a computer memory 26 in communication with the processor 28. Software with instructions for execution by the processor 28 may be stored on the computer memory 26. The processor 28 may execute the software to perform various functions, such as retrieve data from the database 12 as described further below. The client computer device 18 may comprise one or more processors 28 and one or more computer memories 26. For convenience, only one processor 28 and only one memory 26 are shown in FIG. 1. The processor 28 may be implemented as an integrated circuit (IC) having one or multiple cores. The memory 26 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. The RAM and/or ROM memory units may be implemented as discrete memory ICs, for example.

An application 30 may be stored in a memory or computer file associated with the client computer device 18. In various embodiments the application 30 may be a rich internet application ("RIA") 30, such as ADOBE® AIR™. In some embodiments, the application 30 may be a document browser, such as a web browser, for example. As is to be appreciated, if a RIA is implemented, the RIA may comprise a web browser, for example. The application 30 may be in communication with the host server 14 and the database 12 through the network 16, for example.

The database 12 may store information that is accessible with the client computer device 18. For example, the database may store a number of electronic documents, such as a first document 40 and a second document 42. The second document 42 may be comprised of a plurality of versions 44, 46, 48 that were created at different times. The content of the second document 42 may vary in each version. As is to be appreciated, "document" may include any type of electronically stored information, such web pages, word processor documents, spreadsheet documents, HTML documents, XHTML documents, mathematical documents, graphical documents, or other types of electronic documents, for example. The first document may include a link 50, such as a hyperlink, that electronically links the first document 40 to the second document 42. Additionally, the second document 42 may contain a link or a plurality of links to other electronically stored documents, including the first document 40, for example. The first document 40 may be displayed on the display 20 of the client computer device 18 by the application 30 when the host server 14 serves the first document 40 to the client computer device 18 via the network 16. When a user of the client computer device 18 activates the link 50 in the first document 40, such as through the input device 22, a version of the second document 42 may be retrieved by the host server 14 from the database 12, served to the client computer device 18 via the network 16, and displayed on the display 20. The process for determining which version 44, 46, 48 to display once the link 50 is activated is described in more detail below.

In one embodiment, referring to FIG. 2, along with displaying the first document 40 on the display 20, the client computer device 18 also may display a navigation parameter 60. While the navigation parameter 60 is illustrated as being displayed on the display 20, it is to be appreciated that navigation parameter 60 may be displayed using a variety of suitable techniques. In some embodiments, the navigation parameter 60 may be displayed in a separate window, a pop-up window, a separate display, or a drop-down menu, for example.

FIGS. 3A, 3B, and 3C illustrate example non-limiting embodiments of the navigation parameter 60. FIG. 3A illustrates an example navigation parameter 60 that is directed to a version number in accordance with one embodiment. A slider 62 allows a user to electronically select a version 64 of a document to be displayed. In one embodiment, the slider has the lowest available version 66 displayed at one end of the slider and the highest available version 68 displayed at another end of the slider. As the slide 70 is selectably translated from one end to the other by the user, the version 64 will increase or decrease accordingly. As is to be appreciated, the user may use the input device 22 to adjust the slide 70 to the desired location in order to adjust the version 64.

FIG. 3B illustrates another example navigation parameter 60 that is directed to a version number. In this embodiment, a series of buttons 74, such as radio buttons, are displayed on the navigation parameter 60. A user can use the input device 22 to select a desired version of a document by selecting the corresponding radio button, such as button 76 for version two. The navigation parameter 60 may display only the number of available versions for a particular document.

FIG. 3C illustrates an example navigation parameter 60 that is directed to a timestamp in accordance with one embodiment. In this embodiment, a timestamp 80 is displayed in the navigation parameter 60. While the illustrated embodiment of the timestamp 80 comprises a time portion 82 and a date portion 84, it is to be appreciated that other formats may be used and these formats are intended to be within the scope of the presently disclosed embodiments. In some embodiments, the timestamp 80 may be comprised of a date, a time, a month, or a quarter, for example. Furthermore, in some embodiments, a graphical calendar, a graphical clock, or other forms of graphical interfaces may be implemented. In the illustrated embodiment, a time incrementor 86 and a date incrementor 88 are used. The time incrementor 86 and date incrementor 88 may comprise graphical display buttons, for example, to increment or decrement the timestamp to a desired historical point in time. As illustrated, the timestamp 80 is 8:00 AM on Jan. 2, 2002. While three embodiments are illustrated, it is to be appreciated that a variety of other formats and techniques for presenting the navigation parameter 60 may be used.

FIG. 4 illustrates an example set of documents and the linking between them. As illustrated, the set of documents may include an A document 100, a B document 102, and a C document 104. The A document 100 contains a link 101 to the B document 102 and the B document 102 contains a link 103 to the C document 104. As may be appreciated, documents 100, 102, and 104 may be stored in the database 12, for example. A series of timestamps 106 illustrates points in the past (historical times) when revisions to the content of the documents 100, 102, and 104 have been made. For example, an A1 version 106 was created at time t2 and an A2 version 108 was created at time t8. A B1 version 110 of the B document 102 was created at time t1, a B2 version 112 was created at time t3, and a B3 version 114 was created at time t6. A C4 version 116 of the C document 104 was created at time t1, a C5 version 118 was created at time t4, a C6 version 120 was created at time t5, and a C7 version 122 was created at time t8. The solid line connectors on FIG. 4 represent links at time t8, while the dashed line connectors on FIG. 4 represent links at time periods prior to time t8. As illustrated, when any one document is revised, documents dependent upon that document do not also have to be revised. Accordingly, memory space may be more efficiently utilized when storing the collection of documents.

In accordance with various embodiments, a user may navigate and display the documents on the client computer device 18. The links within each document, however, do not contain a path to an individual version of a document, but rather link to a document in general. When an individual document is accessed via a link, the system 10 determines the most recently created version of the document relative to the navigation parameter 60 inputted by the user. For example, a user may also browse the documents in "real-time" (e.g., not using historical browsing functionality), which will result in viewing the most recent version of documents. If the "real-time" for example is time t4, the user will be accessing or viewing the A1 version 106 of the A document 100. If the user activates a link on the A1 version to the B document 102, the system 10 will determine that the B2 version 112 of the document 102 is the most recent version relative to the "real-time", time t4. The host server 14 (FIG. 1) will retrieve the B2 version 112 of the document 102 and then serve it to the client computer device 18. If the user then activates a link on the B2 version of the document to the C document 104, the system 10 will determine that the C5 version 118 is the most recent version and will then retrieve the C5 version 118.

While the system 10 may be used for "real-time" access to the documents, it may also be used for historical browsing. Thus, in accordance with various embodiments, the navigation experience at a historical point in time may be replicated or otherwise reproduced. In other words, the exact interconnection of documents at a historical point in time and the content of those documents at that point in time may be viewed and/or documented. As described above, the entry point for the historical navigation may be a timestamp, or a version number, for example, as established by the navigation parameter 60. As may be appreciated, other entry points may be used, such as an event-based entry point. Assuming the "real-time" is time t8, a user may use the navigation parameter 60 to choose a historical entry point equivalent to time t2, for example, or any other time prior to time t8. At that point, the A1 version 106 would be displayed to the user. In order to replicate the navigation experience at time t2, the system 10 would need to determine the appropriate version of the B document 102 to retrieve when the user accesses the link to the B document 102. In this example, to replicate at time t8 the browsing experience at time t2, it would be determined by the system 10 that the B1 version 110 should be displayed when the link 101 in the A document 100 is activated. Furthermore, were the user to access the link to the C document 104, the system 10 would determine that the C4 version 116 of the C document 104 would need to be displayed to the user to replicate the browsing experience at the historical time t2. Accordingly, based on any suitable historical timestamp, the system can replicate the browsing experience based on that timestamp and serve the appropriate versions of the documents to the user.

As shown in FIGS. 3A and 3B, a user may also use a version number of a document as an entry point for a historical browsing experience. As shown in FIG. 4, a particular version of a document may exist for an extended period of time. The B2 version 112, for example, was created at time t3 and existed until time t6, when the content of the document was altered to create the B3 version 114. Therefore, the system 10 may determine at which time along that period of existence will serve as the entry point. In one embodiment, the system 10 determines the timestamp when the requested document was incremented to one version higher than the requested version (e.g. the "determined timestamp'). The requested version of the document at a timestamp immediately proceeded the determined timestamp may then be retrieved from the database 12 and served to the user.

For example, if the B2 version 112 of the B document 102 is selected as the entry point for a historical browsing experience, the system 10 would determine when the B2 version 112 was changed to the B3 version 114. Based on the example illustrated in FIG. 4, the B2 version 112 was changed to the B3 version 114 at time t6. In this example, time t6 is the "determined timestamp." The host server 14 would then deliver to the user the version of the B document 102 at time t5. Further, in order to provide a browsing experience based on the B2 version entry point, the C6 version 120 would be displayed if the link 103 to the C document 104 was accessed by the user.

In some embodiments, the content of the document on the display may change as the user selects different entry points using the navigation parameter. For example, with reference to the B document 102, if the user is viewing the document on the display 20 in real-time (e.g., time t8), the B3 version 114 will be displayed. If the user, through the navigation parameter 60 selects a historical entry point, the content of the B document 102 presented on the display 18 will adjust accordingly. If the user selects version one through a navigation parameter 60 similar to that of FIG. 3A, for example, the B1 version 110 may be automatically displayed on display 20. Similarly, if the user selects a timestamp associated with time t4 through a navigation parameter 60 similar to that of FIG. 3C, for example, the B2 version 112 may automatically be displayed on the display 20. As may be appreciated upon consideration of this disclosure, in some embodiments, a user may adjust the entry point for a particular document using the navigation parameter 60 and observe content change of the document over time. For example, a user may step through and view all of the available versions of a document by sliding a slider or sequentially selecting the appropriate radio buttons, for example. As the versions of the document are displayed, the content of the document will also change. In some embodiments, the changes in content may be highlighted or otherwise identified.

In various embodiments, referring to FIG. 5, the system 10 may implement a client-side interception technique using a RIA. A browser 140 may reside on the client computer device 18. As may be appreciated, the browser 140 may be a component of a RIA. When the user accesses a link to a document, an interceptor module 142 may intercept the navigation call 144. The interceptor module 142 may also be a software component of the RIA that is executed by the processor 28 of the device 18. The interceptor module 142 may parse the navigation call to identify the target document. For example, the target document may be the B document 102 (see FIG. 4). As is to be appreciated, the navigation call 144 need not request any particular version of the B document 102. The interceptor module 142 may use the navigation parameter 60 to dynamically determine which version of the target document should be retrieved for the user. In one embodiment, the interceptor module 142 queries the host server 14, by sending an electronic query message via the network 16, to determine the appropriate version based on the navigation parameter. Based on the response from the server that is sent in an electronic message via the network 16, the interceptor module 142 may then dynamically set a calculated path with a given version number for the target document link. An electronic request 146 may be sent to the host server 14 via the network 16 by the client computer device 18 that contains the calculated path. The host server 14 queries the database 12 and delivers the target document via a delivery 148 (via the network 16) to the client computer device 18.

In other embodiments, referring to FIG. 6, the system 10 may implement a server-side interception. A browser 160, or other type of document viewer, may reside on the client computer device 18. A document may be displayed on the display of the client computer device 18 that contains dynamic hyperlinks. The client-side may relay a navigation parameter, such as a timestamp, to the host server 14 via a parameter transmission 162 sent via the network 16. The parameter transmission 162 may be relayed to the host server 14 via any suitable technique, such as AJAX. Using the information from the parameter transmission 162, the host server 14 may send data 164 to the client computer device 18 that populates the dynamic hyperlinks of the document displayed by the browser 160. The populated links point to appropriate target documents based on the navigation parameter sent to the host server 15 in the parameter transmission 162. An AJAX push, for example, may be used to dynamically populate the links as the navigation parameter changes. In various embodiments, the population and/or modification of the links is transparent to the user of the browser 160. When the user activates a dynamic link on the browser 160, a request 166 containing the path to the target document is sent to the host server 14 via the network 16. Upon retrieving the target document from the database 12, the host server 14 delivers the target document to the client computer device 18 via delivery 168 (sent via the network 16).

In some embodiments, the links in the documents to be displayed on the browser 160 are augmented using a JAVA script bridge. Therefore, instead of functioning as a static link to a particular document, the link is dynamic and waits to receive information about the target document from the host server 14. Accordingly, as the navigation parameter is changed by the user, the host server 14 may automatically and dynamically change the path of the links in the documents so that they point to the appropriate documents.

FIG. 7 provides an example flow chart of a client-side interception implementation in accordance with various embodiments. At 200, a first document is displayed by a monitor or display of the client computer device 18. At 202, the user inputs a navigation parameter that is received by a client computer device 18. At 204, a request to access a second document is received/intercepted by the interceptor module 142 of the client computer device 18. For example, a user may activate an electronic link on the first document that is intercepted by the interceptor module 142. At 206, the version of the second document is determined. In one embodiment, the navigation parameter is sent to a server, and the server determines the associated version number for the linked-to document based on the navigation parameter 60. At 208, a dynamic path for the second document is determined by the computer system based on the determined version number of the linked-to document. At 210, the requested version of the second document is retrieved from the database 12 and delivered by the host server 14 via the network 16 to the client computing device 18. At 212, the request version of the document is displayed by the browser application on the display 20 of the client computing device 18.

FIG. 8 provides an example flow chart of a server-side implementation in accordance with various embodiments. At 214, a first document is displayed by a monitor or display of the client computing device 18. At 216, the user inputs a navigation parameter 60 that is received by the client computing device 18. At 218, a hyperlink on the first document is populated by (e.g., pushed from) the host server 14 based on the navigation parameter 60. At 220, a request to access a second document is received by the host server 14. The request may have a dynamic path to a target document based on the navigation parameter. At 222, the requested document is retrieved from the database 12 by the host server 14 and delivered by the host server 14 via the network 16 to the client computing device 18. At 224, the requested version of the document is displayed by the browser application on the display of the client computing device 18.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers, or other processor-based devices. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for browsing electronic documents, comprising:

storing a plurality of electronic documents in a computer database, wherein the computer database is in electronic communication with a host server, wherein the plurality of documents comprises a first document and a second document, wherein the first document comprises a hyperlink to the second document, wherein the second document comprises a first version and a second version and the hyperlink in the first document does not specify a version of the second document;

displaying the first document on a client computing device comprising a rich internet application, wherein the client computing device is in communication with the host server, wherein the client computing device comprises a processor circuit and a memory circuit, and wherein the host server comprises a processor circuit and a memory circuit, and wherein the rich internet application comprises a browser for displaying documents, including the first document;

receiving by the rich internet application of the client computing device a client side navigation parameter while the first document is displayed on the client computing device;

receiving by the rich internet application of the client computing device a client side request to access the second document through activation of the hyperlink in the first document;

determining with the rich internet application of the client computing device a requested version of the second document based on the client side navigation parameter, wherein determining the requested version comprises:

intercepting by the rich internet application of the client computing device a navigation call from the browser for the second document;

sending by the rich internet application a query message to the host server for a version of the second document; and based on a response from the host server, determining a calculated path for the requested version of the second document;

determining with the rich internet application of the client computing device a dynamic path for the requested version of the second document, wherein the requested version is one of the first version and the second version;

retrieving by the host server the requested version of the second document based on the dynamic path; and displaying the requested version of the second document on the client computing device.

2. The method of claim 1, wherein the navigation parameter is a version request.

3. The method of claim 1, wherein the navigation parameter is a timestamp request.

4. The method of claim 3, wherein the first version is created at a first timestamp and the second version is created at a second timestamp that is later in time than the first timestamp.

5. The method of claim 4, further comprising comparing with the rich internet application the timestamp request to the first timestamp and the second timestamp;

retrieving the first version when the timestamp request is only subsequent to the first timestamp; and retrieving the second version when the timestamp request is subsequent to the first timestamp and the second timestamp.

6. The method of claim 1, wherein the navigation parameter is selected using a graphical input provided by the client computing device.

7. The method of claim 6, wherein the graphical input is selected from a group consisting of a slider and a plurality of radio buttons.

8. A computer-implemented method for browsing electronic documents, comprising:

storing a plurality of electronic documents in a computer database, wherein the plurality of documents comprises a first document and a second document, wherein the computer database is in electronic communication with a host server, wherein the second document comprises a first version and a second version, wherein the first document comprises a hyperlink to the second document, and wherein the hyperlink in the first document does not specify a version of the second document;

displaying the first document on a client computing device that is in communication with the host server, wherein the client computing device comprises a processor circuit and a memory circuit, and wherein the host server comprises a processor circuit and a memory circuit, and wherein the client computing device comprises a browser for displaying documents, including the first document;

receiving by the host server a client side navigation parameter from the client computing device while the first document is displayed on the client computing device;

determining by the host server based on the navigation parameter a desired version of the second document, wherein the desired version is either the first or second version of the second document;

dynamically populating by the host server the hyperlink on the first document such that it points to the desired version of the second document;

receiving by the host server from the client computing device a request to access the second document using the hyperlink in the first document;

retrieving by the host server the desired version of the second document based on the dynamically populated hyperlink; and displaying the requested version of the second document on the client computing device.

9. The method of claim 8, wherein the navigation parameter is a version request.

10. The method of claim 8, wherein the navigation parameter is a timestamp request.

11. The method of claim 10, wherein the first version is created at a first timestamp and the second version is created at a second timestamp.

12. The method of claim 11, wherein the timestamp request is compared to the first timestamp and the second timestamp, and the first version is retrieved when the timestamp request is only subsequent to the first timestamp and the second version is retrieved with the timestamp request is subsequent to the first timestamp and the second timestamp.

13. The method of claim 8, wherein the navigation parameter is selected using a graphical input provided by the client computing device.

14. The method of claim 13, wherein the graphical input is selected from a group consisting of a slider and a plurality of radio buttons.

15. A system, comprising:

a computer database configured to store a plurality of documents, wherein the plurality of documents comprises a first document and a second document, wherein the first document comprises a hyperlink to the second document, wherein the second document comprises a first version and a second version;
a host server in electronic communication with the computer database;
a client computing device for displaying at least one of the plurality of documents, wherein the client computing device in communication with the host server, wherein the client computing device comprises a rich internet application, wherein the rich internet application comprises a browser and an interceptor module;
wherein the client computing device is configured to receive a navigation parameter while the first document is displayed on the client computing device,
wherein the interceptor module is for:
  intercepting a navigation call from the browser to identify a request for the second document; and
  dynamically determining a requested version of the second document by:
    sending a query message to the host server to determine the requested version of the second document based on the navigation parameter; and
    based on a response from the host server, set a calculated path for the requested version of the second document in the hyperlink, wherein the requested version is associated with one of the first version and the second version of the second document; and
wherein the host server is configured to retrieve the requested version of the second document upon activation of the hyperlink in the first document based on the calculated path, and
wherein the host server is configured to serve the requested version of the second document to the client computing device.

16. The system of claim 15, wherein the navigation parameter is one of a version request and a timestamp request.

17. A system, comprising:
a computer database configured to store a plurality of documents, wherein the plurality of documents comprises a first document and a second document, wherein the first document comprises a dynamic hyperlink to the second document, wherein the second document comprises a first version and a second version, and the dynamic hyperlink in the first document does not specify a version of the second document;
a host server in electronic communication with the computer database;
a client computing device for displaying at least one of the plurality of documents, including the first document, wherein the client computing device is configured to receive a navigation parameter while the first document is displayed on the client computing device, and wherein the client computing device is in communication with the host server and is for relaying the navigation parameter to the host server;
wherein the host server is configured to determine a requested version of the second document based on the navigation parameter and populate the dynamic hyperlink on the first document based on a navigation parameter with a path to the request version of the second document such that the dynamic hyperlink points to the requested version of the second document, and
wherein, upon a user of the client computing device activating the dynamic hyperlink in the first document, the client computing device is for sending a request to the host server with the path and the host server is configured to retrieve the requested version of the second document in response to the request from the client computing device based on the path.

18. The system of claim 17, wherein the navigation parameter is one of a version request and a timestamp request.

* * * * *